United States Patent
Gonzalez et al.

(10) Patent No.: US 12,292,944 B2
(45) Date of Patent: May 6, 2025

(54) LOSS FUNCTION OPTIMIZATION USING TAYLOR SERIES EXPANSION

(71) Applicant: Cognizant Technology Solutions U.S. Corporation, College Station, TX (US)

(72) Inventors: Santiago Gonzalez, Denver, CO (US); Risto Miikkulainen, Stanford, CA (US)

(73) Assignee: Cognizant Technology Solutions U.S. Corp., College Station, TX (US)

( * ) Notice: Subject to any disclaimer, the term of this patent is extended or adjusted under 35 U.S.C. 154(b) by 841 days.

(21) Appl. No.: 17/019,766

(22) Filed: Sep. 14, 2020

(65) Prior Publication Data

US 2021/0089832 A1 Mar. 25, 2021

Related U.S. Application Data

(60) Provisional application No. 62/902,458, filed on Sep. 19, 2019.

(51) Int. Cl.
*G06F 17/11* (2006.01)
*G06F 17/16* (2006.01)
(Continued)

(52) U.S. Cl.
CPC .............. *G06F 17/11* (2013.01); *G06F 17/16* (2013.01); *G06F 17/18* (2013.01); *G06F 18/10* (2023.01);
(Continued)

(58) Field of Classification Search
CPC .. G06N 3/08; G06N 7/01; G06F 17/18; G06F 17/16; G06F 18/10; G06F 18/217;
(Continued)

(56) References Cited

U.S. PATENT DOCUMENTS 5,140,530 A 8/1992 Guha
5,761,381 A 6/1998 Arci
(Continued)

FOREIGN PATENT DOCUMENTS

EP 0762294 A2 3/1997
EP 2422276 A1 2/2012
(Continued)

OTHER PUBLICATIONS

Hidden quality cost function of a product based on the cubic approximation of the Taylor (Year: 2018).*

(Continued)

*Primary Examiner* — Vincent Gonzales
*Assistant Examiner* — Em N Trieu
(74) *Attorney, Agent, or Firm* — Dawn-Marie Bey; Bey & Cotropia PLLC

(57) ABSTRACT

A process for optimizing loss functions includes progressively building better sets of parameters for loss functions represented as multivariate Taylor expansions in accordance with an iterative process. The optimization process is built upon CMA-ES. At each generation (i.e., each CMA-ES iteration), a new set of candidate parameter vectors is sampled. These candidate parameter vectors are sampled from a multivariate Gaussian distribution representation that is modeled by the CMA-ES covariance matrix and the current mean vector. The candidates are then each evaluated by training a model (neural network) using the candidates and determining a fitness value for each candidate against a validation data set.

9 Claims, 8 Drawing Sheets

(51) Int. Cl.

| | | |
|---|---|---|
| *G06F 17/18* | (2006.01) | |
| *G06F 18/10* | (2023.01) | |
| *G06F 18/21* | (2023.01) | |
| *G06N 3/08* | (2023.01) | |
| *G06N 7/01* | (2023.01) | |
| *G06V 10/72* | (2022.01) | |
| *G06V 10/764* | (2022.01) | |
| *G06V 10/776* | (2022.01) | |
| *G06V 10/82* | (2022.01) | |

(52) U.S. Cl.
CPC .............. *G06F 18/217* (2023.01); *G06N 3/08* (2013.01); *G06N 7/01* (2023.01); *G06V 10/72* (2022.01); *G06V 10/764* (2022.01); *G06V 10/776* (2022.01); *G06V 10/82* (2022.01)

(58) Field of Classification Search
CPC .... G06F 17/11; G06V 10/764; G06V 10/776; G06V 10/72; G06V 10/82
USPC .......................................................... 706/25
See application file for complete search history.

(56) References Cited

U.S. PATENT DOCUMENTS

| | | | |
|---|---|---|---|
| 5,845,266 | A | 12/1998 | Lupien |
| 5,920,848 | A | 7/1999 | Schutzer |
| 5,930,780 | A | 7/1999 | Hughes |
| 6,240,399 | B1 | 5/2001 | Frank |
| 6,249,783 | B1 | 6/2001 | Crone |
| 7,013,344 | B2 | 3/2006 | Megiddo |
| 7,246,075 | B1 | 7/2007 | Testa |
| 7,370,013 | B1 | 5/2008 | Aziz |
| 7,444,309 | B2 | 10/2008 | Branke |
| 8,331,632 | B1 | 12/2012 | Mohanty |
| 8,639,545 | B2 | 1/2014 | Cases |
| 8,768,811 | B2 | 7/2014 | Hodjat |
| 9,053,431 | B1 | 6/2015 | Commons |
| 9,466,023 | B1 | 10/2016 | Shahrzad |
| 9,785,886 | B1 | 10/2017 | Andoni |
| 11,120,361 | B1 * | 9/2021 | Januschowski ........ G06N 20/00 |
| 11,410,076 | B1 * | 8/2022 | Huszar .................... G06F 17/11 |
| 2002/0019844 | A1 | 2/2002 | Kurowski |
| 2002/0174079 | A1 | 11/2002 | Mathias |
| 2003/0014379 | A1 | 1/2003 | Saias |
| 2003/0158887 | A1 | 8/2003 | Megiddo |
| 2004/0044633 | A1 | 3/2004 | Chen |
| 2004/0143559 | A1 | 7/2004 | Ayala |
| 2004/0210545 | A1 | 10/2004 | Branke |
| 2004/0254901 | A1 | 12/2004 | Bonabeau |
| 2005/0033672 | A1 | 2/2005 | Lasry |
| 2005/0122337 | A1 | 6/2005 | Chen |
| 2005/0136480 | A1 | 6/2005 | Brahmachari |
| 2005/0187848 | A1 | 8/2005 | Bonissone |
| 2005/0197875 | A1 | 9/2005 | Kauffman |
| 2005/0198103 | A1 | 9/2005 | Ching |
| 2006/0218107 | A1 | 9/2006 | Young |
| 2007/0100907 | A1 | 5/2007 | Bayer |
| 2007/0143198 | A1 | 6/2007 | Brandes |
| 2007/0143759 | A1 | 6/2007 | Ozgur |
| 2007/0150435 | A1 | 6/2007 | Murakawa |
| 2007/0185990 | A1 | 8/2007 | Ono |
| 2008/0071588 | A1 | 3/2008 | Eder |
| 2008/0228644 | A1 | 9/2008 | Birkestrand |
| 2009/0125370 | A1 | 5/2009 | Blondeau |
| 2009/0327178 | A1 | 12/2009 | Jacobson |
| 2010/0030720 | A1 | 2/2010 | Stephens |
| 2010/0111991 | A1 | 5/2010 | Raitano |
| 2010/0182935 | A1 | 7/2010 | David |
| 2010/0256795 | A1 | 10/2010 | Mclaughlin |
| 2010/0257228 | A1 | 10/2010 | Staggs |
| 2010/0257605 | A1 | 10/2010 | Mclaughlin |
| 2010/0274742 | A1 | 10/2010 | Hodjat |
| 2012/0239592 | A1 | 9/2012 | Esbensen |
| 2012/0313798 | A1 | 12/2012 | Markram |
| 2013/0311412 | A1 | 11/2013 | Lazar |
| 2014/0011982 | A1 | 1/2014 | Marasco |
| 2014/0278130 | A1 | 9/2014 | Bowles |
| 2015/0288573 | A1 | 10/2015 | Baughman |
| 2016/0048753 | A1 | 2/2016 | Sussillo |
| 2016/0063359 | A1 | 3/2016 | Szegedy |
| 2016/0329047 | A1 | 11/2016 | Tur |
| 2016/0364522 | A1 | 12/2016 | Frey |
| 2017/0109355 | A1 | 4/2017 | Li |
| 2017/0193367 | A1 | 7/2017 | Miikkulainen |
| 2017/0206317 | A1 | 7/2017 | Ratwani |
| 2017/0213156 | A1 | 7/2017 | Hammond |
| 2017/0323636 | A1 | 11/2017 | Xiao |
| 2018/0053092 | A1 | 2/2018 | Hajizadeh |
| 2018/0114115 | A1 | 4/2018 | Liang |
| 2018/0114116 | A1 | 4/2018 | Liang |
| 2018/0240041 | A1 | 8/2018 | Koch |
| 2018/0336457 | A1 | 11/2018 | Pal |
| 2019/0019582 | A1 | 1/2019 | Wallis |
| 2020/0410157 | A1 | 12/2020 | Van De Kerkhof |

FOREIGN PATENT DOCUMENTS

| | | |
|---|---|---|
| EP | 2422278 A1 | 2/2012 |
| JP | H0810804 | 1/1996 |
| JP | H08110804 | 4/1996 |
| JP | H09114797 A | 5/1997 |
| JP | 2001325041 A | 11/2001 |
| JP | 2003044665 A | 2/2003 |
| JP | 2004240671 A | 8/2004 |
| JP | 2004302741 A | 10/2004 |
| JP | 2005190372 A | 7/2005 |
| JP | 2007207173 A | 8/2007 |
| JP | 2007522547 A | 8/2007 |
| JP | 2008129984 A | 6/2008 |
| WO | 2005073854 A2 | 8/2005 |
| WO | 2010120440 A2 | 10/2010 |
| WO | 2017161233 | 9/2017 |
| WO | 2018211138 | 11/2018 |
| WO | 2018213840 | 11/2018 |

OTHER PUBLICATIONS

Optimization of Amplitude Modulation Features for Low-Resource Acoustic Scene Classification (Year: 2015).*
Modified parameter optimization of distribution transformer design using covariance matrix adaptation evolution strategy (Year: 2014).*
Efficient Optimization for Rank-based Loss Functions (Year: 2018).*
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"CS 224D: Deep Learning for NLP, Lecture Notes: Part III". 14 pp., Spring, 2016.
Jun. 22, 2011 Office Action in U.S. Appl. No. 12/267,287, 16 pp.
Aug. 1, 2012 Office Action in U.S. Appl. No. 13/443,546, 12 pp.
Aditya Rawal and Risto Miikkulainen, "From Nodes to Networks: Evolving Recurrent Neural Networks," GECCO '18, Jul. 15-19, 2018, 8 pages, Kyoto, Japan.
Akbarzadeh et al., "Friendship Modeling for Cooperative Co-Evolutionary Fuzzy Systems: A Hybrid GA-GP Algorithm," Proc. 22nd Int'l Conf. ofN. American FIPS, Jul. 2003, pp. 61-66.
Alex Castrounis, Innoarchtech, "Production vs. Development AI and Machine Learning,"published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
AU 2010241594-Examination Report dated Oct. 8, 2013, 3 pages.
AU 2010241597-Examination Report dated Nov. 4, 2013, 4 pages.

(56) References Cited

OTHER PUBLICATIONS

Bartlett II, J. E., et al., "Organizational Research: Determining Appropriate Sample Size in Survey Research," IT, Learning, and Performance Journal, 19(1), Spring 2001, 8 pp.
Bongard et al., "Guarding Against Premature Convergence while Accelerating Evolutionary Search," Proc. 12th annual conf. of Genetic and evolutionary computation, Jul. 2010, 8 pages.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723. 1883738, (Mar. 15, 2019), XP019146179.
Bredeche, Nicolas, et al., "On-line, on-board evolution of robot controllers," International Conference on Artificial Evolution, Springer, Berlin, Heidelberg, 13 pages, 2009.
Bui, L.T. et al., "Local models: An approach to distributed multi-objective optimization," Computational Optimization and Applications, vol. 42, No. I, Jan. 2009, pp. 105-139.
Castillo Tapia M.G. et al., "Applications of multi-objective evolutionary algorithms in economics and finance: A survey," Proc. IEEE Congress on Evolutionary Computation, Sep. 2007, pp. 532-539.
Davarynejad et al., "A Novel General Framework for Evolutionary Optimization: Adaptive Fuzzy Fitness Granulation," CEC Sep. 2007, 6 pp.
Davarynejad, "Fuzzy Fitness Granulation in Evolutionary Algorithms for complex optimization," Master of Science Thesis, Ferdowsi Univ. of Mashhad, Jun. 2007, 30 pages.
Ducheyne, E. et al., "Is Fitness Inheritance Useful for Real-World Applications?" Evolutionary Multi-Criterion Optimization, ser. LNCS 2631, 2003, pp. 31-42.
E. Meyerson and R. Miikkulainen, "Beyond Shared Hierarchies: Deep Multitask Learning Through Soft Layer Ordering," ICLR, 14 pages, 2018.
Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.
Exam Report for related application AU 2008323758, dated Apr. 20, 2012, 2 pp.
Extended EP SR for EP 08847214 dated Nov. 26, 2012 , 9 pp.
Fernando et al., "Pathnet: Evolution channels gradient descent in super neural networks," arXiv preprint arXiv:1701.08734 (2017), 16 pages.
Fidelis, Marcos Vinicius, Heitor S. Lopes, and Alex A. Freitas, "Discovering Comprehensible Classification Rules With a Genetic Algorithm," 6 pages, Proceedings of the 2000 Congress on Evolutionary Computation, vol. 1, IEEE, 2000.
Fitzpatrick, J.M. et al., "GeneticAlgorithms in Noisy Environments," Machine Learning 3: 101-120, May 1988.
Garcia-Pedrajas, et al., "Cooperative Coevolution of Artificial Neural Network Ensembles For Pattern Classification," IEEE Transactions on Evolutionary Computation, vol. 9, No. 3, 32 pages, Jun. 3, 2005.
Garcia-Pedrajas, et al., "Cooperative-Coevolution-of-Artificial-Neural-Networks", 2005, 32 pages.
Gaspar-Cunha, A., et al., "A Multi-Objective Evolutionary" Algorithm Using Neural Networks to Approximate Fitness Evaluations, Int'l. J. Computers, Systems and Signals, 6(1), pp. 18-36, 2005.
Georgilakis, P.S. "Genetic Algorithm Model for Profit Maximization of Generating Companies in Deregulated Electricity Markets", Applied Artificial Intelligence, Jul. 2009, 23:6,538-552.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv:2002.00059v3), Jun. 6, 2020, 13 pages.

H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Hansen, et al., "Completely derandomized self-adaptation in evolution strategies," Evolutionary Computation, vol. 9, No. 2, pp. 159-195, 2001.
Hansen, N. and Ostermeier, A. (1997). Convergence properties of evolution strategies with the derandomized covariance matrix adaptation: The (p, pl, A)-CMA-ES. In Zimmermann, H.-J., editor, Proceedings of EUFIT'97, Fifth European Congress on Intelligent Techniques and Soft Computing, pp. 650-654, Verlag Mainz, A.
Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.
International Preliminary Report on Patentability for PCT App. PCT/US2019/061198, dated Nov. 18, 2020, 24 pp.
International Search Report and Written Opinion for Application No. PCT/US2018/064520, dated Mar. 4, 2019. 8 pages.
International Search Report and Written Opinion for PCT App. No. PCT/US19/61198, dated Mar. 11, 2020, 15 pp.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US2008/82876, Dec. 23, 2008, 8 pp.
International Search Report and Written Opinion for PCT Application No. PCT/US2019/017175, dated Jun. 5, 2019, 10 pp.
International Search Report mailed Jul. 2, 2010 in PCT/US 10/32847, 3 pages.
International Search Report mailed Jun. 29, 2010 in PCT/US 10/32841, 3 pages.
J. Z. Liang, et al., "Evolutionary Architecture Search For Deep Multitask Networks," GECCO, 2018.
J.T. Barron, "A General and Adaptive Robust Loss Function," arXiv: 1701.03077, 2018, 19 pages.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
JP 2010-533295, Office Action dated Apr. 16, 2013, 3 pages.
JP 2012-508660-Office Action dated Apr. 1, 2014, 8 pages.
JP 2012-508663-Office Action dated Apr. 1, 2014, 6 pages.
Juille, H., "Evolution of Non-Deterministic Incremental Algorithms as a New Approach for Search in State Spaces," Proc. 6th Int'l. Conf. on Genetic Algorithms, 1995 8 pp.
Jul. 27, 2012 Final Office Action in U.S. Appl. No. 12/267,287, 14 pp.
Julian G. Zilly, Rupesh Kumar Srivastava, Jan ICoutnik, and Jurgen Schniidhuber, "Recurrent Hiehwav Networks." CORR abs/1607.03474. 2016 (Arxiv: 1607.03474} 13 pages.
K. Janocha and W. M. Czarnecki, "On Loss Functions for Deep Neural Networks in Classification," arXiv: 1702.05659, 10 pages, 2017.
Kenneth O. Stanley and Risto Miikkulainen, "Evolving Neural Networks Through Augmenting Topologies," Evolutionary Computation, 10(2):99-127, 2002.
Kosorukoff, A. "Using incremental evaluation and adaptive choice of operators in a genetic algorithm," Proc. Genetic and Evolutionary Computation Conference, GECCO—Sep. 2002, 7pp.
Koza, J.R., "Genetic Programming: On the Programming of Computers by Means of Natural Selection", 1992, MIT Press pp. 1-609.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Lee, Chi-Ho, et al., "Evolutionary ordered neural network with a linked-list encoding scheme," Proceedings of IEEE International Conference on Evolutionary Computation, IEEE, 5 pages, 1996.

(56) References Cited

OTHER PUBLICATIONS

Leon, C. et al., 'Parallel hypervolume-guided hyperheuristic for adapting the multi-objective evolutionary island model', NICSO 2008, Studies in Computational Intelligence, Nov. 12, 2008, vol. 236pp. 261-272.
Li, Xiaodong, and Michael Kirley. "The effects of varying population density in a fine-grained parallel genetic algorithm." Evolutionary Computation, 2002. CEC'02. 6 pages. Proceedings of the 2002 Congress on. vol. 2. IEEE2002.
Liang, et al., "Population-Based Training for Loss Function Optimization," 10 pages, arXiv:2002.04225vl (Feb. 11, 2020).
Lopez Haimes et al., "MRMOGA: parallel evolutionary multi-objective optimization using multiple resolutions," In: Proceedings of IEEE Congress on Evolutionary Computation, 2294-2301, 2005.
Meyerson, et al., "Pseudo-Task Augmentation: From Deep Multitask Learning to Intratask Sharing and Back," arXiv:1803.04062, 10 pages, 2018.
Miikkulainen, Risto, et al., "Evolving Deep Neural Networks," Mar. 4, 2017, 8 pp.
Misra et al., "Cross-stitch networks for multi-task learning," In Proceedings of the IEEE Conference on Computer Vision and Pattern Recognition, pp. 3994-4003. 2016.
Moriarty, David E., et al., "Forming neural networks through efficient and adaptive coevolution," Evolutionary Computation 5.4, 28 pages, 1997.
Myers, R.N. and Montgomery, D.C., "Response Surface Methodology: Process and Product Optimization Using Designed Experiments," New York: John Wiley and Sons, Inc., 1995pp. 1-700.
N. Hansen, et al., "Adapting arbitrary normal mutation distributions in evolution strategies: The covariance matrix adaptation," In Proceedings of IEEE International Conference on Evolutionary Computation, pp. 312-317, IEEE, 1996.
N. Hansen, et al., "Evaluating the CMA evolution strategy on multimodal test functions," International Conference on Parallel Problem Solving from Nature, Springer, pp. 282-291, 2004.
Nelson, A., "Fitness Functions in Evolutionary Robotics: A Survey and Analysis," Robotics and Autonomous Systems 67, 2009, 345-370.
Pantridge et al., Evolution of Layer Based Neural Networks: Preliminary Report, GECCO '16, pp. 1015-1022, Jul. 2016. (Year: 2016).
Poli R et al., "Genetic Programing: An introductory Tutorial and a Survey of Techniques and Applications," Univ. Essex School of Computer Science and Eletronic Engineering Technical Report No. CES-475, Oct. 2007, 112 pp.
R. Miikkulainen, J. Liang, E. Meyerson, et al., 2017, "Evolving Deep Neural Networks," CoRR, abs/1703.00548, Mar. 2017. 73 pages.
Remde et al. "Evolution of Fitness Functions to Improve Heuristic Performance," LION Dec. 8-10, 2007 II, LNCS 5313 pp. 206-219.
Risto Miikkulaiiien, "Evolving Multitask Neural Network Structure," The University of Texas at Austin and Sentient Technologies. Inc . Aug. 26, 2013, 22 pages.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.
Ruder, "An Overview of Multi-Task Learning in Deep Neural Networks," In: Cornell University Library /Computer Science/ Machine Learning, Jun. 15, 2017 [online] [retrieved on Mar. 15, 2019], Retrieved from the Internet: https://arxrv.org/abs/1706.05098, 14 pages.
Sacks et al., "Design and Analysis of Computer Experiments," Statistical Science 4:4, 1989, 409-435.
Sakauchi et al., UNIFINE: A Next Generation Financial Solution System of Nihon Unisys Ltd., Technology Review UNISYS,' Japan, Nihon Unisys Ltd., Feb. 28, 2006, vol. 25, No. 4pp. 14-15.
Salami et al., "A fast evaluation strategy for evolutionary algorithms," Applied Soft Computing 2/3F (Jan. 2003) 156-173.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.
Santiago Gonzalez, et al., "Improved Training Speed, Accuracy, and Data Utilization Through Loss Function Optimization," Version 3, arXiv: 1905.11528v3, dated Apr. 27, 2020. 7 pages.
Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT20Q4), Bering, China, Sep. 20-24, 2004, pp. 421-424.
Scott, E. O., et al., "Understanding Simple Asynchronous Evolutionary Algorithms," Jan. 17-20, 2015, 15 pp.
Shazeer et al., "Outrageously large neural networks: The sparsely-gated mixiure-of-experts layer," arXiv preprint arXiv:1701.08538 (2017), 19 pages.
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley, Kenneth O., et al., "Real-Time Evolution of Neural Networks in the Nero Video Game," AAAI, vol. 6, 2006, 4 pp.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 pp., Retrieved from the Internet: http:// www.ra.cs.uni-tuebingen.de/mitarb/streiche/publications/Introduction_to_E_volutionary_Algorithms.pdf., XP055038571.
Supplementary European Search Report dated Oct. 12, 2012 in EP 10770288, 12 pages.
Supplementary European Search Report dated Oct. 9, 2012 in EP 107702871, 11 pages.
Tanev, I., et al., "Scalable Architecture for Parallel Distributed Implementation of Genetic Programming on Network of Workstations," J. Systems Architecture, vol. 47, Jul. 2001, pp. 557-572.
Torresen, "A Dynamic Fitness Function Applied to Improve the Generalisation when Evolving a Signal Processing Hardware Architecture," Proc. EvoWorkshops 2002, 267-299 (12 pp).
Ustun, et al., "Determination of optimal support vector regression parameters by genetic algorithms and simplex optimization", Analytica Chimica Acta 544 (2005) 292-305 (Year: 2005).
Ian Goodfellow, et al., "Generative Adversarial Nets," Proceedings of the International Conference on Neural Information Processing Systems (NIPS 2014), pp. 2672-2680.
Joseph Rocca, "Understanding Generative Adversarial Networks (GANs), Building, step by step, the reasoning that eads to GANs" [online], Jan. 7, 2019 [retrieved Sep. 14, 2020], Towards Data Science, 21 pp., Retrieved From the Internet: https://towaxdsdatascience.com/understanding-generative-adersarial-networks-ganscd6e4651a29.
M. Arjovsky, et al., "Wasserstein generative adversarial networks," Proceedings of the 34th International Conference on Machine Learning, PMLR 70, pp. 214-223, Sydney, Australia, Aug. 6-11, 2017.
I. Gulrajani, et al., "Improved Training of Wasserstein GANs," Advances in Neural Information Processing Systems 30, pp. 5767-5777, Curran Associates, Inc., arXiv: 1704.00028v3, 2017.
X. Mao, et al., "On the Effectiveness of Least Squares Generative Adversarial Networks," IEEE transactions on pattern analysis and machine intelligence, arXiv: 1712.06391v2, 2018.
Victor Costa, et al., "COEGAN: Evaluating the Coevolution Effect in Generative Adversarial Networks," arXiv:1912.06180vl, Dec. 12, 2019, 9 pp.
Alec Radford, et al., "Unsupervised Representation Learning With Deep Convolutional Generative Adversarial Networks," arXiv: 1511.06434v2, Jan. 7, 2016, 16 pp.

(56) References Cited

OTHER PUBLICATIONS

U.S. Appl. No. 13/895,238—Office Action dated Jan. 2, 2014, 17 pages.
U.S. Appl. No. 14/014,063—Office Action dated May 7, 2014, 19 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
U.S. Appl. No. 62/468,224, titled "Asynchronous Evaluation Strategy For Evolution of Deep Neural Networks," filed Mar. 7, 2017.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.
Utech, J., et al., "An evolutionary algorithm for drawing directed graphs," Proc. of the Int. Conf. on Imaging Science, Systems and Technology, 8 pages, 1998.
Written Opinion from Singapore Patent Office in related application SG 201003127-6, dated Jun. 16, 2011, 9 pp.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv:1605.06391 (2016), 12 pages.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.

\* cited by examiner

LOSS FUNCTION OPTIMIZATION USING TAYLOR SERIES EXPANSION

CROSS REFERENCE TO RELATED APPLICATIONS

This application claims benefit of priority to U.S. Provisional Application No. 62/902,458 entitled "LOSS FUNCTION OPTIMIZATION USING TAYLOR SERIES EXPANSION" filed Sep. 19, 2019 which is incorporated herein by reference in its entirety.

This application cross-references and incorporates by reference herein in its entirety, U.S. patent application Ser. No. 16/878,843 entitled SYSTEM AND METHOD FOR LOSS FUNCTION METALEARNING FOR FASTER, MORE ACCURATE TRAINING, AND SMALLER DATASETS, which was filed on May 29, 2020. This application also cross-references and incorporates herein commonly owned U.S. patent application Ser. No. 15/794,905 entitled EVOLUTION OF DEEP NEURAL NETWORK STRUCTURES and U.S. patent application Ser. No. 16/212,830 entitled EVOLUTIONARY ARCHITECTURES FOR EVOLUTION OF DEEP NEURAL NETWORKS.

Additionally, the article by Gonzalez et al., entitled Optimizing Loss Functions Through Multivariate Taylor Polynomial Parameterization published electronically and available in version 1 (published arXiv: 2002.00059v1; Jan. 31, 2020), version 2 (published arXiv: 2002.00059v2; Feb. 10, 2020) and version 3 (published arXiv:2002.00059v3; Jun. 6, 2020) is incorporated herein by reference in its entirety. The article lists overlapping authors with the inventors and provides additional description and support for the embodiment set forth herein.

FIELD OF THE TECHNOLOGY

The field of the technology is loss function discovery and optimization.

BACKGROUND

Machine learning (ML) has provided some significant breakthroughs in diverse fields including financial services, healthcare, retail, transportation, and of course, basic research. The traditional ML process is human-dependent, usually requiring an experienced data science team, to set-up and tune many aspects of the ML process. This makes the power of ML inaccessible to many fields and institutions.

Accordingly, there is on-going development to automate the process of applying machine learning to real-world problems. Hereafter referred to generally as AutoML, such automation would ideally reflect automation of each aspect of the ML pipeline from the raw dataset to the deployable models. With AutoML, it is anticipated that laymen would be able to take advantage of the power of ML to address real world problems by efficiently producing simpler solutions models that would potentially outperform human-engineered designs.

Much of the power of modern neural networks originates from their complexity, i.e., number of parameters, hyperparameters, and topology. This complexity is often beyond human ability to optimize, and automated methods are needed. An entire field of metalearning has emerged recently to address this issue, based on various methods such as gradient descent, simulated annealing, reinforcement learning, Bayesian optimization, and evolutionary computation (EC). Metalearning can generally be described as a subfield of machine learning where automatic learning algorithms are applied on metadata about machine learning experiments and is also referred to as learning to learn.

In addition to hyperparameter optimization and neural architecture search, new opportunities for metalearning have recently emerged. In particular, learning rate scheduling and adaptation can have a significant impact on a model's performance. Learning rate schedules determine how the learning rate changes as training progresses. This functionality tends to be encapsulated away in practice by different gradient-descent optimizers, such as AdaGrad and Adam which are known to those skilled in the art. While the general consensus has been that monotonically decreasing learning rates yield good results, new ideas, such as cyclical learning rates, have shown promise in learning better models in fewer epochs.

Recently, loss-function discovery and optimization has emerged as a new type of metalearning. It aims to tackle neural network's root training goal, by discovering better ways to define what is being optimized. In doing so, it makes it possible to regularize the solutions automatically. Genetic Loss Optimization (GLO), described in U.S. patent application Ser. No. 16/878,843, which is incorporated herein by reference, provides an initial implementation of this idea using a combination of genetic programming and evolutionary strategies. However, loss functions can be challenging to represent in an optimization system because they have a discrete nested structure as well as continuous coefficients. GLO tackles this problem by discovering and optimizing loss functions in two separate steps: evolution of structure, e.g., as trees, and evolving them with Genetic Programming (GP), and optimization of coefficients using, e.g., Covariance-Matrix Adaptation Evolutionary Strategy (CMA-ES) which is described in N. Hansen et al, Adapting arbitrary normal mutation distributions in evolution strategies: The covariance matrix adaptation. In Proceedings of IEEE international conference on evolutionary computation, pages 312-317. IEEE, 1996, which is incorporated herein by reference. Such separate processes make it challenging to find a mutually optimal structure and coefficients. Furthermore, the structured search space is difficult since small changes to the genotype do not always result in small changes in the phenotype and can easily make a function invalid.

Accordingly, there remains a need in the art for improved, automated loss-function discovery and optimization.

SUMMARY OF CERTAIN EMBODIMENTS

In a first exemplary embodiment, a process for optimizing a loss function for a model solving a particular problem comprises: (i) providing an initial mean solution vector to a multi-dimensional continuous value optimization process running on one or more processors; (ii) generating a set of candidate loss function parameters using the initial mean solution vector for use in building a first set of candidate loss functions in accordance with a predetermined loss function representation; (iii) evaluating each of the candidate loss functions in the first set of candidate loss function with the model including: (a) building each of the first candidate loss functions using the initial set of candidate loss function parameters; (b) at least partially training the model on a training data set related to the particular problem using each of the first candidate loss functions; (c) evaluating the model trained with each of the first candidate loss functions on a validation data set related to the particular problem; (d) obtaining individual fitness values for each of the first candidate loss functions from the evaluation in (c); (iv) ranking each of the first candidate loss functions in accordance with individual fitness values, wherein each of the first candidate loss functions includes a different set of candidate loss function parameters; (v) repeating steps (ii) to (iv) for multiple generations to optimize the loss function for the model solving the particular problem, including replacing the initial mean vector solution with a new mean vector solution derived from a ranked first candidate loss function in accordance with fitness value; and (iv) selecting an optimized loss function for the model solving the particular problem at a predetermined selection point.

In a second exemplary embodiment, a computer-readable medium storing instructions that, when executed by a computer, perform a process for optimizing a loss function for a model solving a particular problem including: (i) providing an initial mean solution vector to a multi-dimensional continuous value optimization process running on one or more processors; (ii) generating a set of candidate loss function parameters using the initial mean solution vector for use in building a first set of candidate loss functions in accordance with a predetermined loss function representation; (iii) evaluating each of the candidate loss functions in the first set of candidate loss function with the model including: (a) building each of the first candidate loss functions using the initial set of candidate loss function parameters; (b) at least partially training the model on a training data set related to the particular problem using each of the first candidate loss functions; (c) evaluating the model trained with each of the first candidate loss functions on a validation data set related to the particular problem; (d) obtaining individual fitness values for each of the first candidate loss functions from the evaluation in (c); (iv) ranking each of the first candidate loss functions in accordance with individual fitness values, wherein each of the first candidate loss functions includes a different set of candidate loss function parameters; (v) repeating steps (ii) to (iv) for multiple generations to optimize the loss function for the model solving the particular problem, including replacing the initial mean vector solution with a new mean vector solution derived from a ranked first candidate loss function in accordance with fitness value; and (iv) selecting an optimized loss function for the model solving the particular problem at a predetermined selection point.

In a third exemplary embodiment, a process for optimizing a loss function for a model solving a particular problem includes: in a first subprocess, iteratively sampling a set of candidate loss function parameter vectors by a multi-dimensional continuous value optimization process running on one or more processors, wherein the candidate loss function parameter vectors are used to build candidate loss functions in accordance with predetermined loss function representation; in a second subprocess, evaluating by an evaluation process running on one or more processors, each candidate loss function built with a sampled candidate loss function parameter vector in the set in the model for solving the particular problem and determining a fitness value for each candidate loss function; in a third subprocess, ranking by the continuous value optimization process each candidate loss function in accordance with its fitness value and initiating a next iteration of the first subprocess of sampling based on the ranking; and repeating the second subprocess, the third subprocess and the first subprocess until an optimized loss function for the model solving the particular problem is selected at a predetermined selection point.

DETAILED DESCRIPTION

Figure 1:
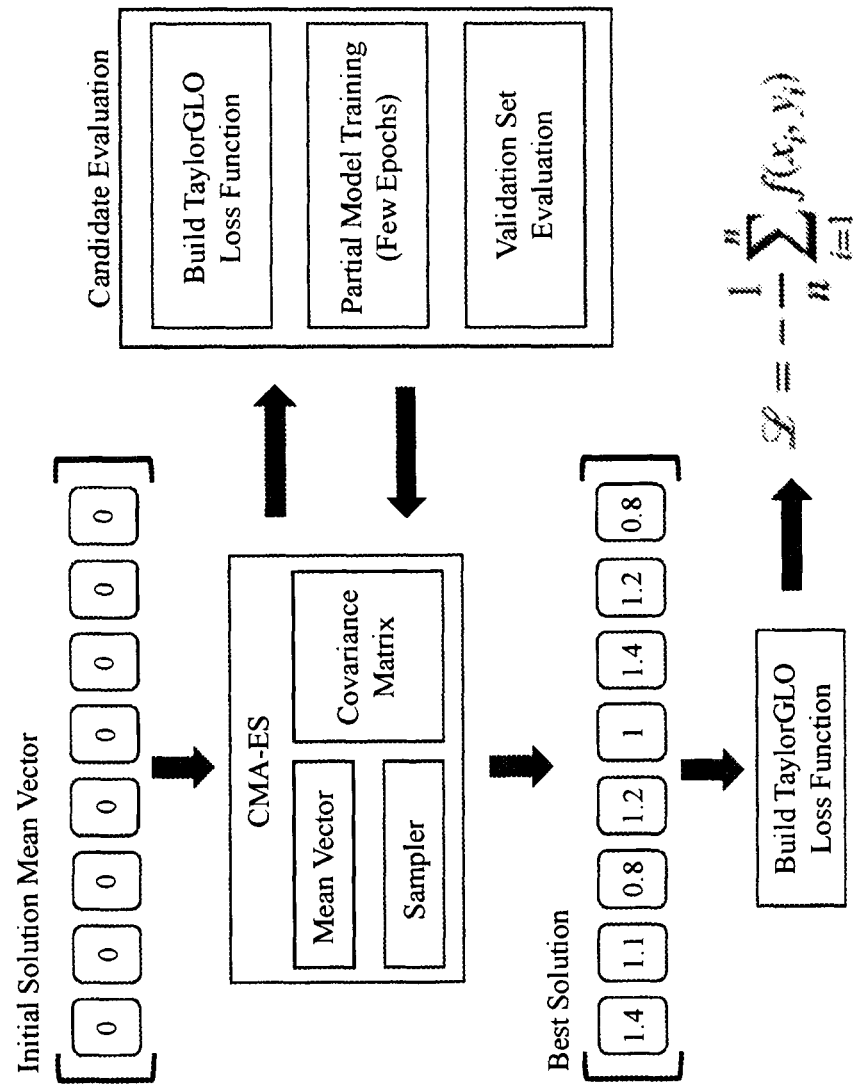
FIG. 1 is a schematic showing the process of loss function optimization in accordance with embodiments herein.

Deep neural networks are traditionally trained iteratively, whereby model parameters (i.e., weights and biases) are updated using gradients propagated backwards through the network, starting from an error given by a loss function. Loss functions represent the primary training objective of a neural network. Loss functions evaluate how well your algorithm models your dataset. As you change the algorithm to try and improve the model, loss function reflects how success of the changes. In many tasks, such as classification and language modeling, the cross-entropy loss (also known as the log loss) is used almost exclusively for the loss function. While in some approaches, a regularization term (e.g. $L^2$ weight regularization) is added to the loss function definition, the core component is still the cross-entropy loss. The cross-entropy loss is motivated by information theory; it aims to minimize the number of bits needed to identify a message from the true distribution, using a code from the predicted distribution.

Other types of tasks that do not fit neatly into a single-label classification framework often have different task-specific loss functions. This observation suggests that it is useful to change the loss function appropriately. Indeed, in statistics it is known that different regression loss functions have unique properties, such as the Huber Loss which is resilient to outliers compared to other loss functions. Every instance where a loss function is chosen for a task without a specific justification is an opportunity to find a more optimal loss function automatically, e.g., through metalearning.

GLO provided an initial study into metalearning of loss functions. GLO is based on a two-phase approach that (1) evolves a function structure using a tree representation, and (2) optimizes a structure's coefficients using an evolutionary strategy. GLO was able to discover Baikal, a new loss function that outperformed the cross-entropy loss on tested image classification tasks, and made it possible to learn with smaller datasets. Baikal appeared to have these characteristics due to an implicit regularization effect that GLO discovered.

Tree-based representations, as used in GLO, have been dominant in genetic programming because they are flexible and can be applied to a variety of function evolution domains. For example, this genetic programming succeeded in discovering nontrivial mathematical formulas that underly physical systems using noisy experimental data. However, due to the two-step approach that GLO takes, GLO is unable to discover a function with mutually beneficial structure and coefficients. Additionally, the majority of loss function candidates in GLO are not useful, since, for example, many of them have discontinuities. Further mutations to tree-based representations can have disproportionate effects on the functions they represent. GLO's search is thus inefficient, requiring large populations that are evolved for many generations.

In an ideal case, loss functions would be smoothly mapped into arbitrarily long, fixed-length vectors in a Hilbert space. This mapping should be smooth, well-behaved, well-defined, incorporate both a function's structure and coefficients, and should by its very nature make large classes of infeasible loss functions mathematically impossible. The embodiments described herein introduce such an approach: Multivariate Taylor expansion-based genetic loss-function optimization (TaylorGLO). With a novel parameterization for loss functions, the key pieces of information that affect a loss function's behavior are compactly represented in a vector. Such vectors are then optimized for a specific task using CMA-ES. Select techniques can be used to narrow down the search space and speed up evolution. Loss functions discovered by TaylorGLO outperform the standard cross-entropy loss (or log loss) on both the MNIST and CIFAR-10 datasets with several different network architectures. They also outperform the Baikal loss, discovered by the original GLO technique, and do it with significantly fewer function evaluations. The reason for the improved performance is that evolved functions discourage overfitting to the class labels, thereby resulting in automatic regularization. These improvements are particularly pronounced with reduced datasets where such regularization matters the most. TaylorGLO thus further establishes loss-function optimization as a promising new direction for metalearning.

Taylor expansions are a well-known function approximator that can represent differentiable functions within the neighborhood of a point using a polynomial series. Below, the common univariate Taylor expansion formulation is presented, followed by a natural extension to arbitrarily-multivariate functions.

Given a $C^{k_{max}}$ smooth (i.e., first through $k_{max}$ derivatives are continuous), real-valued function, $f(x): \mathbb{R} \to \mathbb{R}$, a kth-order Taylor approximation at point $a \in \mathbb{R}$, $\hat{f}_k(x, a)$, where $0 \leq k \leq k_{max}$, can be constructed as, $$\hat{f}_k(x, a) = \sum_{n=0}^{k} \frac{1}{n!} f^{(n)}(a)(x-a)^n. \quad (1)$$

Conventional, univariate Taylor expansions have a natural extension to arbitrarily high-dimensional inputs of f. Given a $C^{k_{max}+1}$ smooth, real-valued function, $f(\vec{x}): \mathbb{R}^n \to \mathbb{R}$, a kth-order Taylor approximation at point $\vec{a} \in \mathbb{R}^n$, $\hat{f}_k(\vec{x}, \vec{a})$, where $0 \leq k \leq k_{max}$, can be constructed. The stricter smoothness constraint compared to the univariate case allows for the application of Schwarz's theorem on equality of mixed partials, obviating the need to take the order of partial differentiation into account.

Let us define an nth-degree multi-index, $\alpha = (\alpha_1, \alpha_2, \ldots, \alpha_n)$, where $\alpha_i \in \mathbb{N}_0$, $|\alpha| = \sum_{i=1}^{n} \alpha_i$, $\alpha! = \prod_{i=1}^{n} \alpha_i!$, $\vec{x}^\alpha = \prod_{i=1}^{n} x_i^{\alpha_i}$, and $\vec{x} \in \mathbb{R}^n$. Multivariate partial derivatives can be concisely written using a multi-index $$\partial^\alpha f = \partial_1^{\alpha_1} \partial_2^{\alpha_2} \ldots \partial_n^{\alpha_n} f = \frac{\partial^{|\alpha|}}{\partial x_1^{\alpha_1} \partial x_2^{\alpha_2} \ldots \partial x_n^{\alpha_n}}. \quad (2)$$

Thus, discounting the remainder term, the multivariate Taylor expansion for $f(\vec{x})$ at $\vec{a}$ is $$\hat{f}_k(\vec{x}, \vec{a}) = \Sigma_{\forall \alpha, |\alpha| \leq k} \frac{1}{\alpha!} \partial^\alpha f(\vec{a})(\vec{x} - \vec{a})^\alpha. \quad (3)$$

The unique partial derivatives in $\hat{f}_k$ and $\vec{a}$ are parameters for a kth order Taylor expansion. Thus, a kth order Taylor expansion of a function in n variables requires n parameters to define the center, $\vec{a}$, and one parameter for each unique multi-index $\alpha$, where $|\alpha| \leq k$. That is:

$$\#_{parameters}(n, k) = n + n + k_k = n + \frac{(n+k)!}{n! \, k!}. \quad (4)$$

The multivariate Taylor expansion can be leveraged for a novel loss-function parameterization. This enables TaylorGLO, a way to efficiently optimize loss functions, as discussed further herein.

To represent loss functions as multivariate Taylor expansions, let an n-class classification loss function be defined as $$\mathcal{L}_f(\vec{x}, \vec{y}) = -\frac{1}{n} \sum_{n=1}^{n} f(x_i, y_i). \quad (5)$$

The function $f(x_i, y_i)$ can be replaced by its kth-order, bivariate Taylor expansion, $\hat{f}_k(x, y, \alpha_x, \alpha_y)$. The TaylorGLO loss function's inputs may vary depending on the application. For example, for a standard classification task, the scaled logits and target label may each be an input. However, additional variables, such as training progress, can be added in to help evolve loss functions that take more other types of model data into account when training. Accordingly, more sophisticated loss functions can be supported by having more input variables, beyond $x_i$ and $y_i$, such as a time variable or unscaled logits. This approach can be useful, for example, to evolve loss functions that change as training progresses. For example, a loss function in $\vec{x}$ and $\vec{y}$ has the following 3rd-order parameterization with parameters $\vec{\theta}$ (where $\vec{a} = \langle \theta_0, \theta_1 \rangle$):

$$L(\vec{x}, \vec{y}) = \quad (8)$$

$$-\frac{1}{n} \sum_{n=0}^{n} \left[ \theta_2 + \theta_3(y_i - \theta_1) + \frac{1}{2}\theta_4(y_i - \theta_1)^2 + \frac{1}{6}\theta_5(y_i - \theta_1)^3 + \theta_6(x_i - \theta_0) + \right.$$

$$\theta_7(x_i - \theta_0)(y_i - \theta_1) + \frac{1}{2}\theta_8(x_i - \theta_0)(y_i - \theta_1)^2 +$$

$$\left. \frac{1}{2}\theta_9(x_i - \theta_0)^2 + \frac{1}{2}\theta_{10}(x_i - \theta_0)^2(y_i - \theta_1) + \frac{1}{6}\theta_{11}(x_i - \theta_0)^3 \right]$$

Notably, the reciprocal-factorial coefficients can be integrated to be a part of the parameter set by direct multiplication if desired.

As discussed further herein, this technique makes it possible to train neural networks that are more accurate and learn faster, than those with tree-based loss function representations. Representing loss functions in this manner confers several useful properties: guarantees smooth functions; functions do not have poles (i.e., discontinuities going to infinity or negative infinity) within their relevant domain; can be implemented purely as compositions of addition and multiplication operations; can be trivially differentiated; nearby points in the search space yield similar results (i.e., the search space is locally smooth), making the fitness landscape easier to search; valid loss functions can be found in fewer generations and with higher frequency; loss function discovery is consistent and does not depend as much on a specific initial population; and the search space has a tunable complexity parameter (i.e., the order of the expansion).

By way of comparison, these properties are not necessarily held by alternative function approximators such as Fourier Series, Padé approximants, Laurent polynomials or Ans Polyharmonic splines; thus leaving multivariate Taylor expansion as the optimal choice.

TaylorGLO aims to find the optimal parameters for a loss function parameterized as a multivariate Taylor expansion, as described above. The parameters for a Taylor approximation (i.e., the center point and partial derivatives) are referred to as $\vec{\theta}_j$, $\vec{\theta}_j \in \Theta$, $\Theta = \mathbb{R}^{\#parameters}$. TaylorGLO strives to find the vector $\vec{\theta}^*_j \in \Theta$ that parameterizes the optimal loss function for a task. Because the values are continuous, as opposed to discrete graphs of the original GLO, it is possible to use continuous optimization methods.

Covariance Matrix Adaptation Evolutionary Strategy (CMA-ES) is a popular population-based, black-box optimization technique for rugged, continuous spaces. CMA-ES functions by maintaining a covariance matrix around a mean point that represents a distribution of solutions. At each generation, CMA-ES adapts the distribution to better fit evaluated objective values from sampled individuals. In this manner, the area in the search space which is being sampled at each step dynamically grows, shrinks, and moves as needed to maximize sampled candidates' fitnesses. On skilled in the art recognizes that a different black-box optimizer for continuous-valued vectors can be used, such as a genetic algorithm.

In TaylorGLO, CMA-ES is used to find try to find $\vec{\theta}^*_j$. At each generation, CMA-ES samples points in $\Theta$ whose fitness is determined; this is accomplished by training a model with the corresponding loss function and evaluating the model on a validation dataset. Fitness evaluations may be distributed across multiple machines in parallel. An initial vector of $\vec{\theta}_j = \vec{0}$ is chosen as a starting point in the search space to avoid bias.

More particularly, referring to FIG. 1, TaylorGLO functions in an iterative manner; progressively building better sets of TaylorGLO parameters, starting from an initial mean solution vector of zeros. The optimization process is built upon CMA-ES. At each generation (i.e., each CMA-ES iteration), a new set of candidate solution vectors is sampled. These candidates are sampled from a multivariate Gaussian distribution represented that is modeled by the CMA-ES covariance matrix and the current mean vector. In the first generation, this distribution is simply a basic Gaussian distribution whose mean across all variables is manually defined a priori (e.g., 1.2 generally works well).

Such candidates are then each evaluated independently and concurrently. Each candidate evaluation builds a TaylorGLO loss function from the candidate parameter vector, and then trains a neural network using this loss function. The training can either go to completion, for less noisy fitness estimates, or can train partially, to reduce computation costs. Additionally, various conditions may be set during the training process to abort early if no progress is being made and the loss function is clearly unusable. At the end of training, the model is evaluated on a validation dataset to get a final fitness value (e.g., accuracy in a classification problem).

CMA-ES takes the fitness values from the current generation's candidate evaluations and uses them to rank the candidates. This ranking determines how the covariance matrix, mean, and various other internal state values need to change for the next generation. Ultimately, this finalizes the generation so that the next generation will sample candidates from a more fruitful part of the search space. The algorithm can be run for an arbitrary number of generations until there is convergence in the best candidate's performance or until a predetermined compute budget is exhausted.

The specific variant of CMA-ES that TaylorGLO uses is $(\mu/\mu,\lambda)$-CMA-ES, which incorporates weighted rank-$\mu$ updates to reduce the number of objective function evaluations that are needed. The following references are descriptive of the CMA-ES configurations utilized in the present embodiments and are incorporated herein by reference in their entireties: N. Hansen and A. Ostermeier, "Adapting arbitrary normal mutation distributions in evolution strategies: The covariance matrix adaptation," in Proceedings of IEEE international conference on evolutionary computation, IEEE, 1996, pp. 312-317; Hansen et al., "Completely derandomized self-adaptation in evolution strategies," Evolutionary computation, vol. 9, no. 2, pp. 159-195, 2001 and N. Hansen et al., "Evaluating the CMA evolution strategy on multimodal test functions," in International Conference on Parallel Problem Solving from Nature. Springer, 2004, pp. 282-291.

Note that fully training a model can prove to be prohibitively expensive for all but the simplest problems. Fundamentally, there is a positive correlation between performance near the beginning of training and at the end of training. In order to identify the most promising candidates, it is enough to train the models only partially. This type of approximate evaluation is widely done in the field and is well-known to those skilled in the art. An additional positive effect is that evaluation then favors loss functions that learn more quickly.

For a loss function to be useful, it must have a derivative that depends on the prediction. Therefore, internal terms that do not contribute to $$\frac{\partial}{\partial \vec{y}} L_f(\vec{x}, \vec{y})$$

can be trimmed away. This implies that any term, t within $f(x_i, y_i)$, where $$\frac{\partial}{\partial y_i} t = 0,$$

can be replaced with 0. For example, this refinement simplifies Equation (6) to:

$$\mathcal{L}(\vec{x}, \vec{y}) = -\frac{1}{n}\sum_{n=1}^{n}\left[\theta_2(y_i - \theta_1) + \frac{1}{2}\theta_3(y_i - \theta_1)^2 + \frac{1}{6}\theta_4(y_i - \theta_1)^3 + \right.$$
$$\left. \theta_5(x_i - \theta_0)(y_i - \theta_1) + \frac{1}{2}\theta_6(x_i - \theta_0)(y_i - \theta_1)^2 + \frac{1}{2}\theta_7(x_i - \theta_0)^2(y_i - \theta_1)\right], \quad (7)$$

providing a reduction in the number of parameters from twelve to eight.

For any polynomial, as is the case for Taylor expansions, the task of determining monotonicity reduces to a root-finding problem. Specifically, a polynomial is monotone within an interval if all roots of its derivative within the interval are of even order. Since there is no closed form solution to root-finding (for polynomials of arbitrary order), an approximation must be used. Most simply, an arbitrary precision approximation of monotonicity can be implemented by calculating $$\frac{\partial}{\partial y}f(1, y),$$

which is trivial for polynomials, and evaluating its sign at an arbitrarily high number of points within (0,1). In the described implementation, 50 points were used.

The TaylorGLO technique was evaluated on known, standard datasets to measure efficiency. The MNIST digit classification and CIFAR-10 natural image classification benchmark tasks were used as domains to measure the technique's efficacy, and provide a point of comparison against GLO and the standard cross-entropy loss function.

The domain used for evaluation was the MNIST Handwritten Digits, a widely used dataset where the goal is to classify 28×28 pixel images as one of ten digits. MNIST has 55,000 training samples, 5,000 validation samples, and 10,000 testing samples. The dataset is well understood and relatively quick to train, and forms a good foundation for understanding how TaylorGLO evolves loss functions. Being a classification problem, MNIST training is traditionally framed with the standard cross-entropy loss:

$$L_{Cross-Entropy} = -\frac{1}{n}\sum_{n=0}^{n}x_i\log(y_i), \quad (8)$$

where $\vec{x}$ is sampled from the true distribution, $\vec{y}$ is from the predicted distribution, and n is the number of classes. The cross-entropy loss is used as a baseline in the experiments. The MNIST task is relatively simple, which makes it possible to illustrate the TaylorGLO process in several ways. The basic CNN architecture evaluated in the GLO study can also be used to provide a direct point of comparison with prior work. Importantly, this architecture includes a dropout layer (20) for explicit regularization. As in GLO, training is based on stochastic gradient descent (SGD) with a batch size of 100, a learning rate of 0.01, and, unless otherwise specified, occurred over 20,000 steps.

A CMA-ES was set to have a population size λ=28 and an initial step size σ=1.2. These values were found to work well experimentally. The candidates were third-order (i.e., k=3) TaylorGLO loss functions (Equation (7)). Such functions were found experimentally to have a better trade-off between evolution time and performance compared to second- and fourth-order TaylorGLO loss functions (although the differences were relatively small).

During candidate evaluation, models were trained for 10% of a full training run. On MNIST, this equates to 2,000 steps (i.e., 4 epochs). The TaylorGLO technique's sensitivity to training steps during candidate evaluation was explored and, overall, the technique is robust even with few training steps. However, on more complex models with abrupt learning rate decay schedules, greater numbers of steps provide better fitness estimates.

For example, TaylorGLO is surprisingly resilient when evaluations during evolution are shortened to 200 steps (i.e., 0.4 epochs) of training. With so little training, returned accuracies are noisy and dependent on each individual network's particular random initialization. On a 60-generation run with 200-step evaluations, the best evolved loss function had a mean testing accuracy of 0.9946 across ten samples, with a standard deviation of 0.0016. While slightly lower, and significantly more variable, than the accuracy for the best loss function that was found on the main 2,000-step run, the accuracy is still significantly higher than that of the cross-entropy baseline, with a p-value of 6.3-6. This loss function was discovered in generation 31, requiring 1,388.8 2,000-step-equivalent partial evaluations. That is, evolution with 200-step partial evaluations is over three-times less sample efficient than evolution with 2,000-step partial evaluations.

On the other extreme, where evaluations consist of the same number of steps as a full training session, one would expect better loss functions to be discovered, and more reliably, because the fitness estimates are less noisy. Surprisingly, that is not the case: The best loss function had a mean testing accuracy of 0.9945 across ten samples, with a standard deviation of 0.0015. While also slightly lower, and also significantly more variable, than the accuracy for the best loss function that was found on the main 2,000-step run, the accuracy is significantly higher than the cross-entropy baseline, with a p-value of 5.1-6. This loss function was discovered in generation 45, requiring 12,600 2,000-step-equivalent partial evaluations; over 28-times less sample efficient as evolution with 2,000-step partial evaluations.

These results thus suggest that there is an optimal way to evaluate candidates during evolution, resulting in lower computational cost and better loss functions. Notably, the best evolved loss functions from all three runs (i.e., 200-, 2,000-, and 20,000-step) have similar shapes, reinforcing the idea that partial-evaluations can provide useful performance estimates.

Due to the number of partial training sessions that are needed to evaluate TaylorGLO loss function candidates, training was distributed across the network to a cluster, composed of dedicated machines with NVIDIA GeForce GTX 1080Ti GPUs. Training itself was implemented with TensorFlow in Python. The primary components of TaylorGLO (i.e., the genetic algorithm and CMA-ES) were implemented in the Swift programming language which allows for easy parallelization. These components run centrally on one machine and asynchronously dispatch work to the cluster.

Several different architectures were evaluated in the CIFAR-10 domain, including AlexNet, AllCNN-C, and Preactivation ResNet-20, which is an improved variant of the ubiquitous ResNet architecture. The CIFAR-10 domain consists of small color photographs of objects in ten classes. CIFAR-10 traditionally consists of 50,000 training samples, and 10,000 testing samples; however 5,000 samples from the training dataset were used for validation of candidates, resulting in 45,000 training samples. Models were trained with their respective hyperparameters from the literature. Inputs were normalized by subtracting their mean pixel value and dividing by their pixel standard deviation. Standard data augmentation techniques consisting of random, horizontal flips and croppings with two pixel padding were applied during training.

Table 1 shows test-set accuracy of loss functions discovered by TaylorGLO compared with that of the cross-entropy loss baseline. The TaylorGLO results are based on the loss function with the highest validation accuracy during evolution. All averages are from ten separately trained models and p-values are from one-tailed Welch's t-Tests. Standard deviations are shown in parentheses. TaylorGLO discovers loss functions that perform significantly better than cross-entropy loss in all architectures with both datasets.

TABLE 1

| Task | Avg. TaylorGLO Acc. | Avg. Baseline Acc. | p-value |
|---|---|---|---|
| MNIST on Basic CNN | 0.9551 (0.0005) | 0.9899 (0.0003) | $2.95 \times 10^{-15}$ |
| CIFAR-10 on AlexNet | 0.7901 (0.0026) | 0.7638 (0.0046) | $1.76 \times 10^{-10}$ |
| CIFAR-10 on AllCNN-C | 0.9271 (0.0013) | 0.8965 (0.0021) | $0.42 \times 10^{-17}$ |
| CIFAR-10 on PreResNet-20 | 0.9169 (0.0014) | 0.9153 (0.0021) | 0.0400 |

The subsequent subsections present experimental results that show both how the TaylorGLO evolution process functions, and how the loss functions from TaylorGLO can be used as high-performance, drop-in replacements for the cross-entropy loss function.

Figure 2:
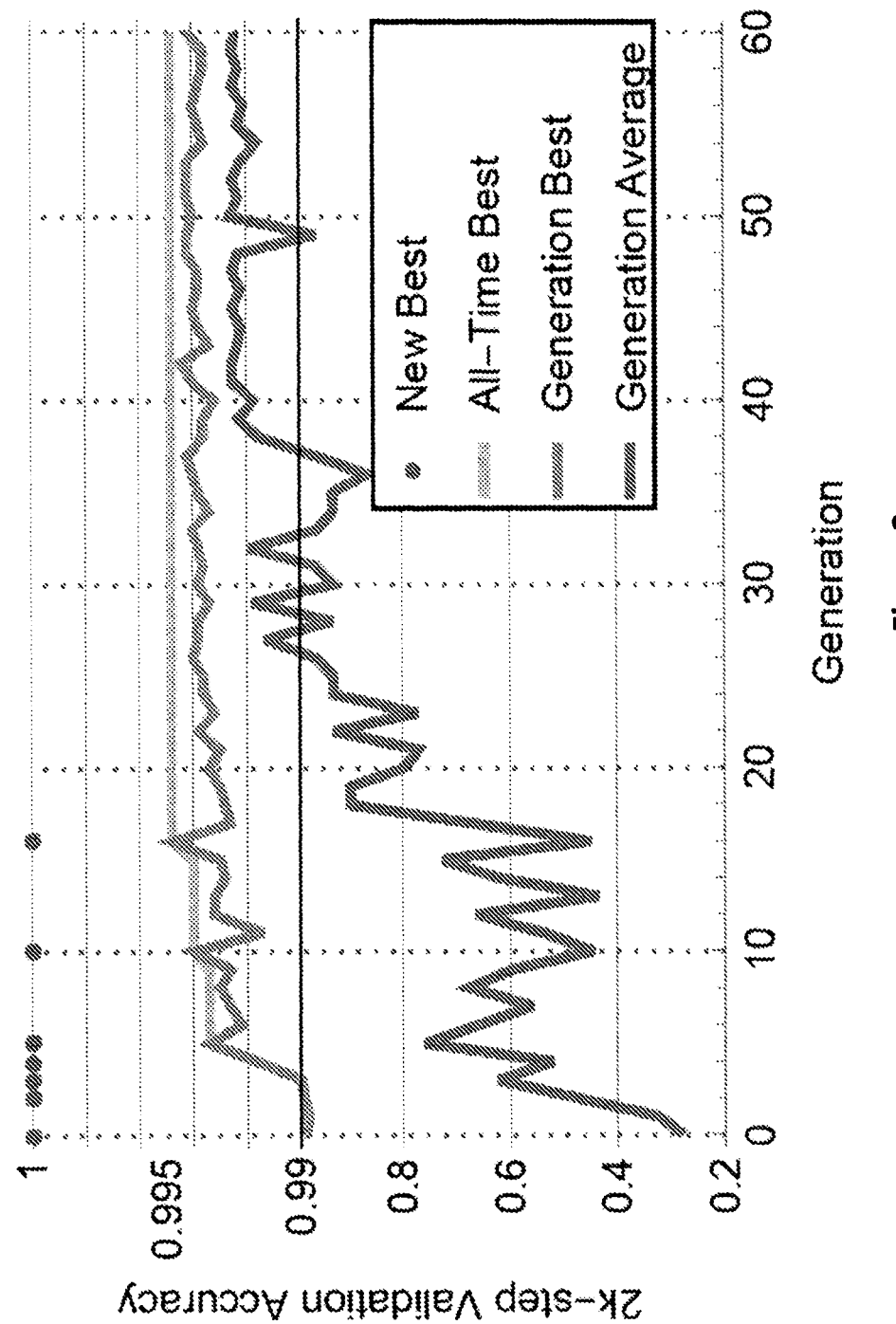
FIG. 2 shows an overview of the evolution process over 60 generations on the MNIST dataset in accordance with an embodiment herein.

FIG. 2 shows an overview of the evolution process over 60 generations on the MNIST dataset, more than sufficient to reach convergence. TaylorGLO is able to quickly discover highly-performing loss functions, with all improvements being discovered within 20 generations. Generations' average validation accuracy approaches generations' best accuracy as evolution progresses, indicating that populations as a whole are improving. Whereas GLO's unbounded search space often results in pathological functions, every TaylorGLO training session completed success-fully without any instabilities. In FIG. 2, the dots mark generations with new improved loss functions. TaylorGLO discovers good functions in very few generations. The best one had a 2000-step validation accuracy of 0.9948, compared to 0.9903 of the cross-entropy loss, averaged over ten runs with a standard deviation of 0.0005 (n=10). This difference translates to a similar improvement on the test set, as shown in Table 1. At 10% through the training process, corresponding to the amount of training undergone to evaluate TaylorGLO candidates, the average testing accuracy was 0.9656 with a standard deviation of 0.0015 (n=10).

Figure 3A:
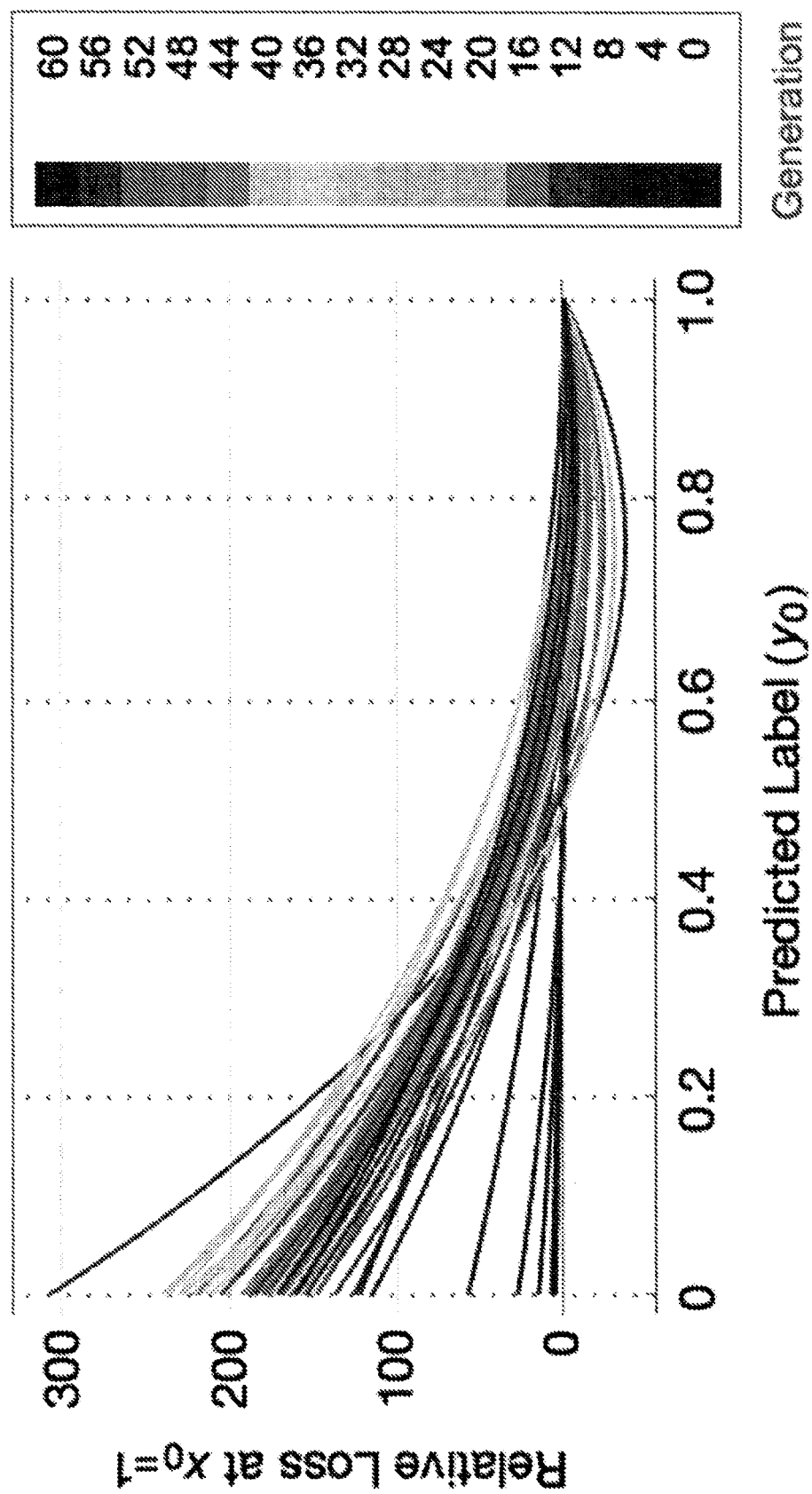
FIGS. 3(a), 3(b) and 3(c) include representations of the best evolved loss functions FIG. 3(a) and their respective parameters FIG. 3(b), as well as a visualization of all evolved loss functions FIG. 3(c) in accordance with embodiments herein.
Figure 3B:
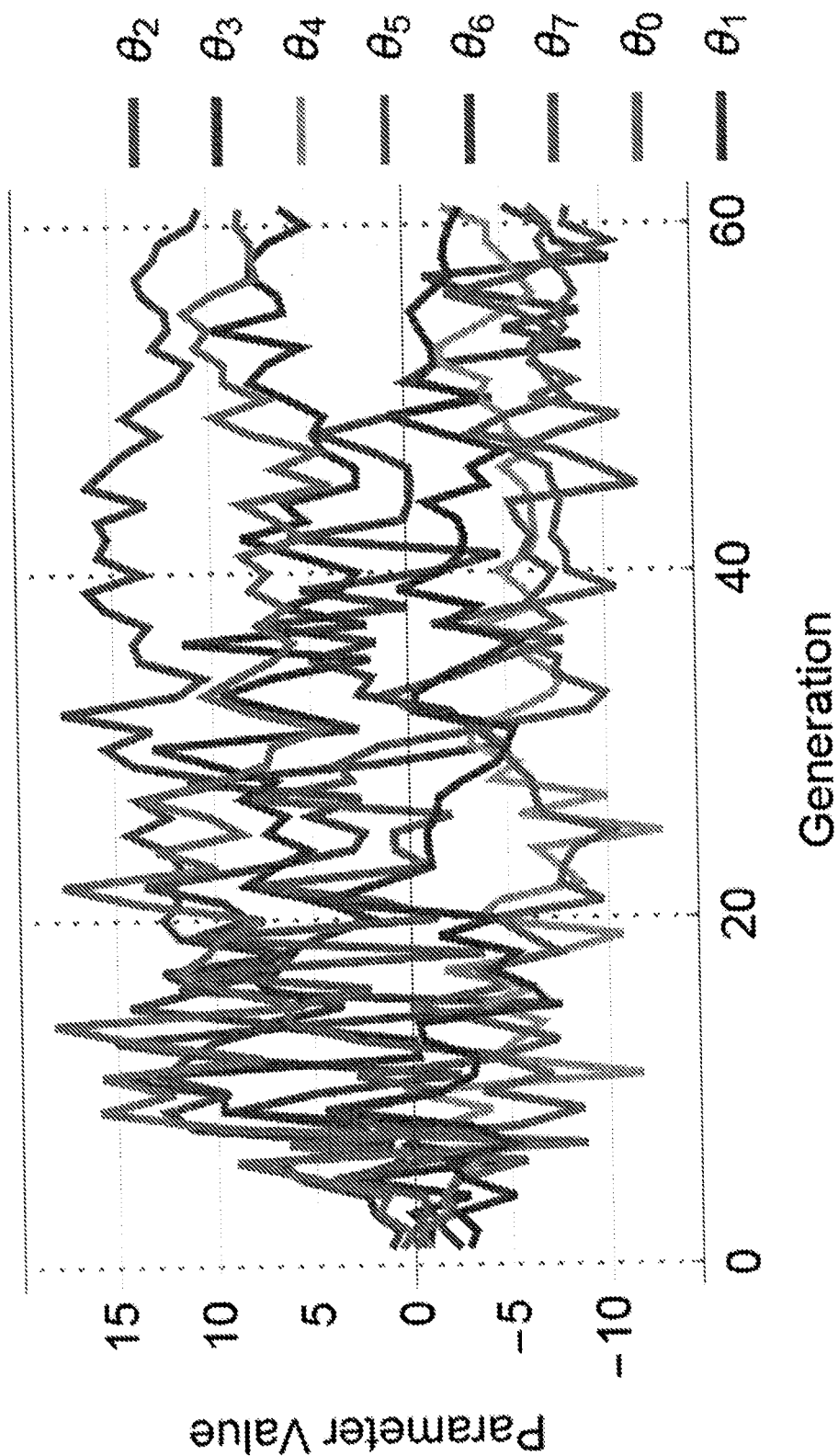

FIGS. 3(a) and 3(b) show the shapes (3(a)) and parameters (3(b)) of each generation's highest-scoring loss function. They are plotted as if they were being used for binary classification, using the procedure described in the GLO study and described in U.S. patent application Ser. No. 16/878,843. The functions are colored according to their generation. Additionally, plotted loss function curves are vertically shifted such that their loss at $y_0=1$ is zero; the raw value of a loss function is not relevant, the derivative, however, is. The functions have a distinct pattern through the evolution process, where early generations show a wider variety of shapes that converge in later generations towards curves with a shallow minimum around $y_0=0.8$ (the best loss function found on MNIST—described below—specifically had a minimum at $y_0=0.8238$). Most notably, these well performing loss functions are not monotonically decreasing as the cross-entropy loss is. They each have a local minima near, but not at, $y_0=1$, after which the loss increases again as $y_0$ approaches 1. This shape provides an implicit regularization effect in the same manner that the Baikal loss function does: it discourages overfitting by preventing the model from being too confident in its predictions. TaylorGLO explores varying shapes of solutions before narrowing down on functions in the red band; this process can also be seen in FIG. 3(b), where parameters become more consistent over time, and in the population plot of FIG. 3(c).

Figure 3C:
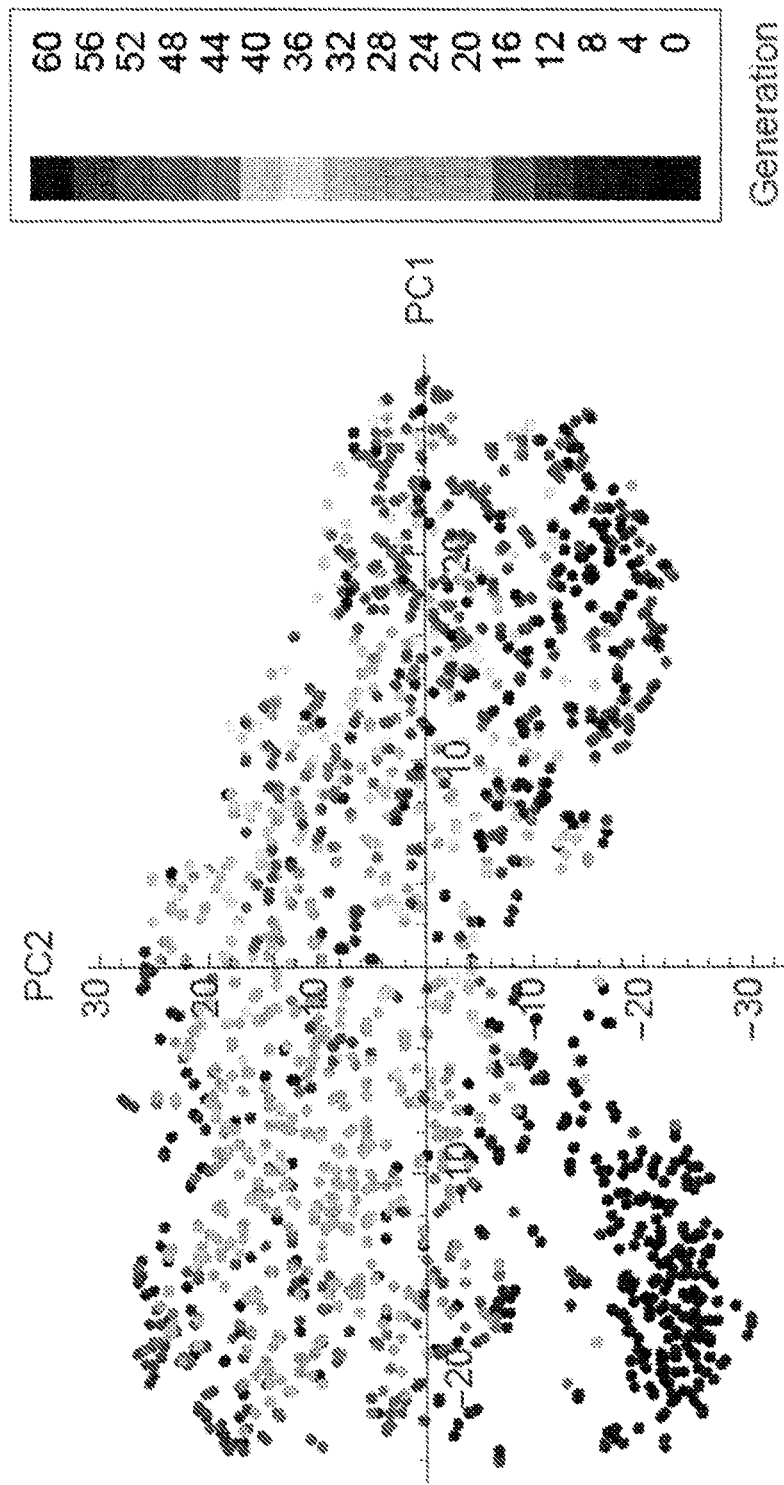

This structure becomes quite evident when dimensionality reduction using t-SNE is performed on every candidate loss function within a run of TaylorGLO evolution, as illustrated in FIG. 3(c). Points on the plot quickly migrate and spread in initial generations as CMA-ES grows the parameter space that is being explored (demonstrating resilience to the initial step size σ). This pattern concurs with the spreading that occurs in early generations in the bottom plot of FIG. 3(a). The points gradually migrate across the t-SNE space and finally coalesce in the smaller region of red points.

The best loss function obtained from running TaylorGLO on MNIST was found in generation 74. This function, with parameters $\vec{\theta} = \langle 11.9039, -4.0240, 6.9796, 8.5834, -1.6677, 11.6064, 12.6684, -3.4674 \rangle$ (rounded to four decimal-places), achieved a 2k-step validation accuracy of 0.9950 on its single evaluation, higher than 0.9903 for the cross entropy loss. This loss function was a modest improvement over the previous best loss function from generation 16, which had a validation accuracy of 0.9958.

Figures 4A, 4B:
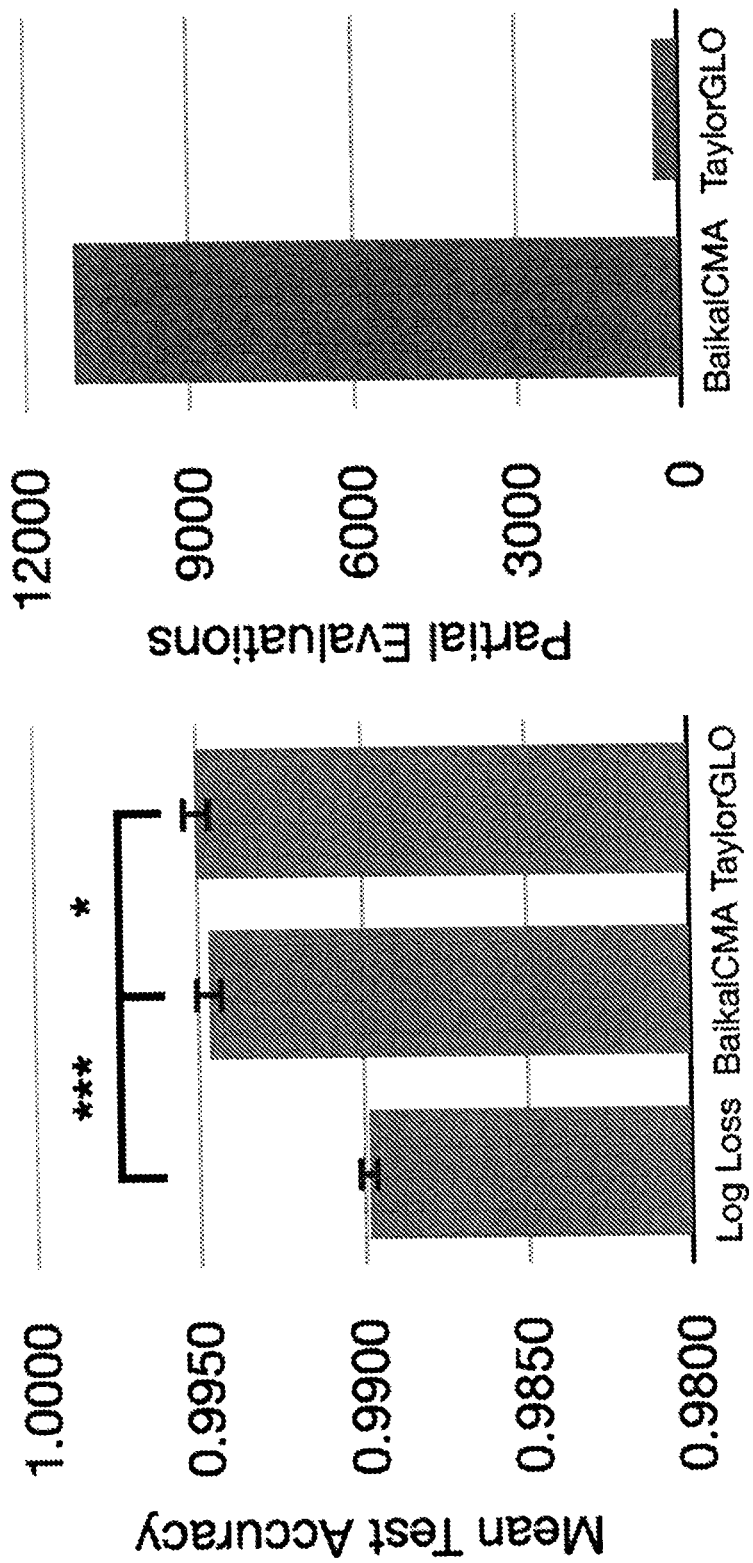
FIGS. 4(a) and 4(b) include representations of mean test accuracy for different loss functions across ten runs on MNIST FIG. 4(a) and representation of required sample partial training evaluations for different loss functions evolved by different methods in accordance with embodiments herein FIG. 4(b)

Over 10 fully-trained models, the best TaylorGLO loss function achieved a mean testing accuracy of 0.9951, with a standard deviation of 0.0005, while the cross-entropy loss only reached 0.9899, and the BaikalCMA loss function from the original GLO technique reached 0.9947, with a standard deviation of 0.0003. This comparison is shown in FIG. 4(a). The TaylorGLO loss function with the highest validation score significantly outperforms the cross-entropy loss (p-value of $2.95 \times 10^{-15}$ in a one-tailed Welch's t-test) and BaikalCMA loss from (11) (p=0.0313 in the same test). Notably, TaylorGLO achieves this result with significantly fewer generations and partial training sessions (FIG. 4(b)). BaikalCMA required 11,120 partial evaluations (i.e., 100 individuals over 100 GP generations plus 32 individuals over 35 CMA-ES generations, ignoring evaluations subsequent to the discovery of BaikalCMA), while the top TaylorGLO loss function only required 448 partial evaluations (that is, 4.03% as many or 96% fewer evaluations than the BaikalCMA loss function with GLO). The testing accuracy improvement the TaylorGLO loss function confers over the cross-entropy loss is highly statistically significant, with a p-value of $5.9^{-15}$, in a heteroscedastic, two-tailed T-test, with 10 samples from each distribution. Using the same type of T-test, the TaylorGLO loss function's improvement over BaikalCMA has a p-value of 0.0625.

Figure 5:
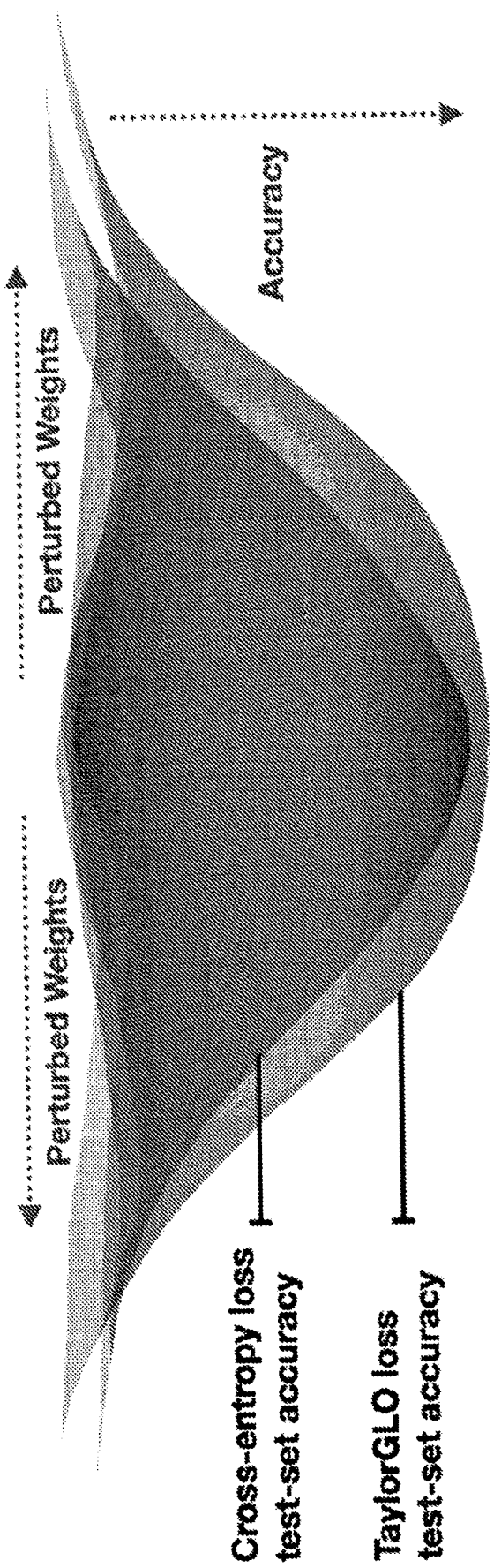
FIG. 5 is a visualization of the loss landscape on an AllCNN-C model using two different loss function in accordance with embodiments herein.

Such a large reduction in evaluations during evolution allows TaylorGLO to tackle harder problems, including models that have millions of parameters. On the CIFAR-10 dataset, TaylorGLO is able to consistently outperform cross-entropy baselines on a variety models, as shown in Table 1. Interestingly, TaylorGLO also provides more consistent results on CIFAR-10, with accuracy standard deviations nearly half of that of the baselines'. In addition, TaylorGLO loss functions also result in more robust trained models. Using a recent visualization technique described in H. Li, et al., Visualizing the loss landscape of neural nets, Advances in Neural Information Processing Systems 31, pages 6389-6399 (Curran Associates, Inc., 2018) which is incorporated herein by reference, accuracy basins for a model can be plotted along a two-dimensional slice (in [−1, 1]) of the network's weight space. FIG. 5 provides such a visualization on an AllCNN-C model. The TaylorGLO loss function results in a flatter, lower basin. This result suggests that the model is more robust, i.e. its performance is less sensitive to small perturbations in the weight space, and it also generalizes better.

Figure 6:
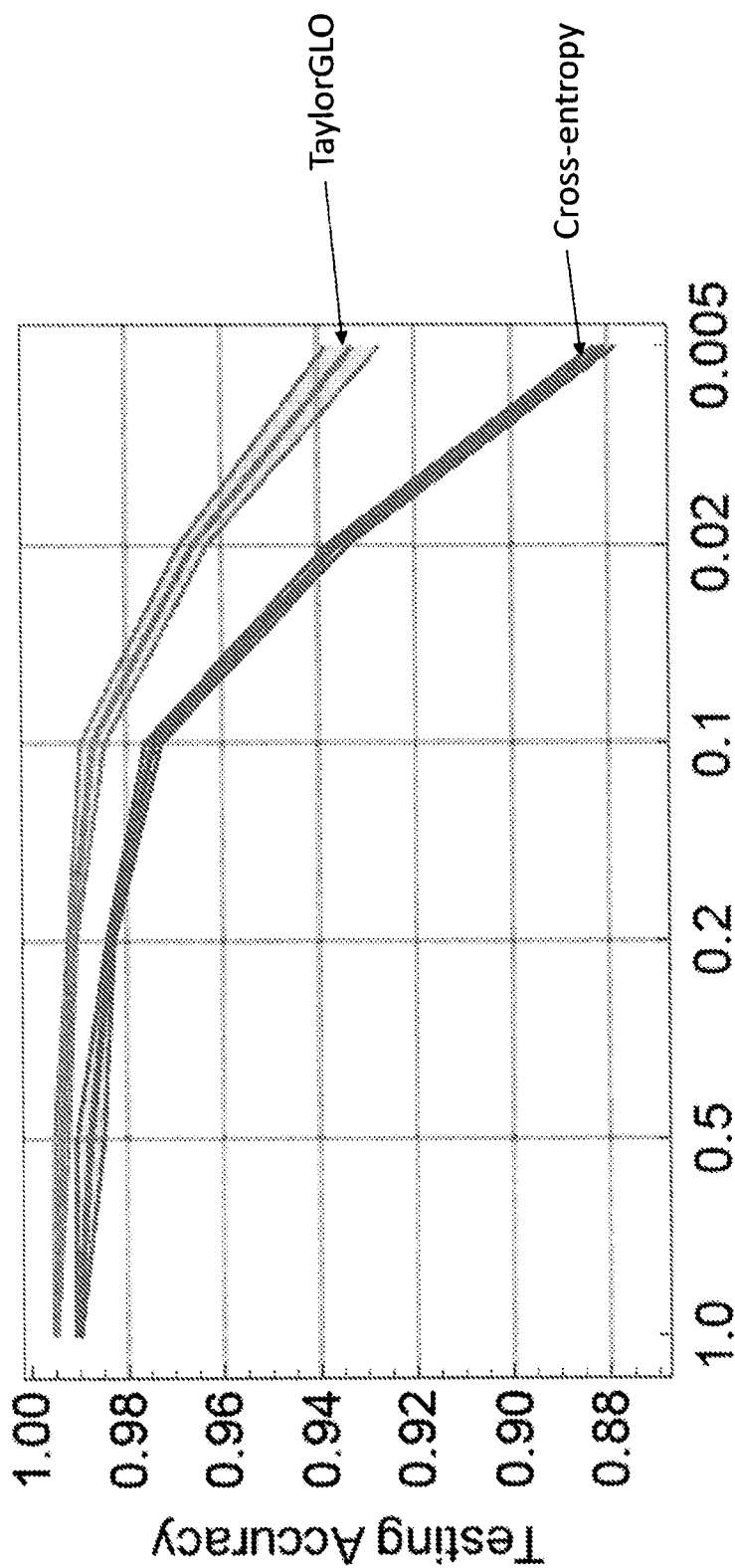
FIG. 6 is plot of accuracy of model trained on progressively smaller datasets using two different loss functions in accordance with embodiments herein.

The performance improvements that TaylorGLO provides are especially pronounced with reduced datasets. For example, FIG. 6 compares accuracies of models trained for 20,000 steps on different portions of the MNIST dataset. Progressively smaller portions of the dataset were used to train the models (averaging over ten runs). The TaylorGLO loss function provides significantly better performance than the cross-entropy loss on all training dataset sizes, and particularly on the smaller datasets. Overall, TaylorGLO significantly outperforms the cross-entropy loss. Similar results were obtained with the AllCNN-C model on CIFAR-10. When evolving a TaylorGLO loss function and training against 10% of the training dataset, with 225 epoch evaluations, TaylorGLO reached an average accuracy across ten models of 0.7595 (standard deviation 0.0062). In contrast, only four out of ten cross-entropy loss models trained successfully, with those reaching a lower average accuracy of 0.6521. Thus, customized loss functions can be especially useful in applications where only limited data is available to train the models, presumably because they are less likely to overfit to the small number of examples.

TaylorGLO was applied to CIFAR-10 using various standard architectures with standard hyperparameters. These setups have been heavily engineered and manually tuned by the research community, yet TaylorGLO was able to improve them. TaylorGLO was able to find a loss function on generation 12 with very similar performance characteristics to the cross-entropy loss, without needing any prior human knowledge. Over ten runs each, the TaylorGLO loss function reached a mean testing accuracy of 0.9115, compared to 0.9105 for cross-entropy, and a standard deviation of 0.0032, compared to 0.0033. Interestingly, the improvements were more substantial with wide architectures and smaller with narrow and deep architectures such as the Preactivation ResNet. While it may be possible to further improve upon this result, it is also possible that loss function optimization is more effective with architectures where the gradient information travels through fewer connections, or is otherwise better preserved throughout the network. An important direction of future work is therefore to evolve both loss functions and architectures together, taking advantage of possible synergies between them.

Another important direction is to leverage additional input variables in TaylorGLO loss functions, such as the percentage of training steps completed. TaylorGLO may then find loss functions that are best suited for different points in training, where, for example, different kinds of regularization work best. Unintuitive changes to the training process, such as cycling learning rates, have been able to improve model performance; evolution could be a useful way to discover similar techniques. Additionally, the technique may be adapted to models with auxiliary classifiers as a means to touch deeper parts of the network.

The proper choice of loss function may depend on other types of state as well. For example, batch statistics could help evolve loss functions that are more well-tuned to each batch; intermediate network activations could expose information that may help tune the function for deeper networks like ResNet; deeper information about the characteristics of a model's weights and gradients, such as that from spectral decomposition of the Hessian matrix, could assist the evolution of loss functions that are able to adapt to the current fitness landscape.

Recently, TaylorGLO was combined with the metalearning algorithm Population-Based Training (PBT) to form an algorithm called Enhanced Population-Based Training (EPBT) that interleaves the training of a DNN's weights with the metalearning of optimal hyperparameters and loss functions. As described in the paper by Liang et al, Population-Based Training for Loss Function Optimization, arXiv:2002.04225v1 (Feb. 11, 2020) which is incorporated herein by reference, the TaylorGLO function parameterization makes it possible to encode a wide variety of different loss functions compactly. On image classification benchmarks, EPBT and TaylorGLO can achieve faster training and better convergence when compared to the standard training process that uses cross-entropy loss.

TaylorGLO is a promising new technique for loss-function metalearning. TaylorGLO leverages a novel parameterization for loss functions, allowing the use of continuous optimization rather than genetic programming for the search, thus making it more efficient and more reliable. TaylorGLO loss functions serve to regularize the learning task, significantly outperforming the standard cross-entropy loss on both MNIST and CIFAR-10 benchmark tasks with a variety of network architectures as discussed herein. They also outperform previously discovered loss functions while requiring many fewer candidates to be evaluated during search. Thus, TaylorGLO is a mature metalearning technique that results in higher testing accuracies, better data utilization, and more robust models. These properties allow TaylorGLO to be used as a general technique that can help humans building machine learning systems to train better models with their finite efforts.

It is submitted that one skilled in the art would understand the various computing environments, including computer readable mediums, which may be used to implemented the methods described herein. Selection of computing environment and individual components may be determined in accordance with memory requirements, processing requirements, security requirements and the like. It is submitted that one or more steps or combinations of step of the methods described herein may be developed locally or remotely, i.e., on a remote physical computer or virtual machine (VM). Virtual machines may be hosted on cloud-based IaaS platforms such as Amazon Web Services (AWS) and Google Cloud Platform (GCP), which are configurable in accordance memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implemented one or more of the features, components and methods described herein, the following articles are referenced and incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Castrounis of Innoarchitech, published online by O'Reilly Media, Copyright InnoArchiTech LLC 2020.

The invention claimed is:

1. A process for optimizing a loss function to train a convolutional neural network (CNN) model for solving a classification problem comprising:
 (i) providing an initial mean solution vector to a multi-dimensional continuous value optimization process running on one or more processors;
 (ii) generating a set of candidate loss function parameters using the initial mean solution vector for use in building a first set of candidate loss functions in accordance with a predetermined loss function representation;
  wherein the predetermined loss function representation is a multivariate Taylor expansion;
  wherein the multivariate Taylor expansion is $$\mathcal{L}(\vec{x}, \vec{y}) = -\frac{1}{n}\sum_{n=1}^{n}\left[\theta_2(y_i - \theta_1) + \frac{1}{2}\theta_3(y_i - \theta_1)^2 + \frac{1}{6}\theta_4(y_i - \theta_1)^3 + \right.$$
$$\left. \theta_5(x_i - \theta_0)(y_i - \theta_1) + \frac{1}{2}\theta_6(x_i - \theta_0)(y_i - \theta_1)^2 + \frac{1}{2}\theta_7(x_i - \theta_0)^2(y_i - \theta_1)\right];$$

(iii) evaluating each of the candidate loss functions in the first set of candidate loss function with the CNN model including:
  (a) building each of the first candidate loss functions using the initial set of candidate loss function parameters;
  (b) at least partially training the CNN model on a training data set related to the classification problem using each of the first candidate loss functions;
  (c) evaluating the CNN model trained with each of the first candidate loss functions on a validation data set related to the classification problem;
  (d) obtaining individual fitness values for each of the first candidate loss functions from the evaluation in (c);
 (iv) ranking each of the first candidate loss functions in accordance with individual fitness values, wherein each of the first candidate loss functions includes a different set of candidate loss function parameters;
 (v) repeating steps (ii) to (iv) for multiple generations to optimize the loss function for training the CNN model solving the classification problem, including replacing the initial mean vector solution with a new mean vector solution derived from a ranked first candidate loss function in accordance with fitness value; and
 (vi) selecting an optimized loss function for training the CNN model solving the classification problem at a predetermined selection point,
  wherein the selected optimized loss function trains the CNN model to solve the classification problem in fewer steps and with higher accuracy than a process for training the CNN model using cross-entropy loss or BaikalCMA loss function.

2. The process according to claim 1, wherein the optimization process is a covariance-matrix adaptation evolutionary strategy (CMA-ES).

3. The process according to claim 2, wherein the CMA-ES is a variant (µ/µ,;\.)-CMA-ES, which incorporates weighted rank-µ updates.

4. A non-transitory computer-readable medium storing instructions that, when executed by a computer, perform a process for optimizing a loss function to train a convolutional neural network (CNN) model solving a classification problem comprising:
 (i) providing an initial mean solution vector to a multi-dimensional continuous value optimization process running on one or more processors;
 (ii) generating a set of candidate loss function parameters using the initial mean solution vector for use in building a first set of candidate loss functions in accordance with a predetermined loss function representation;
  wherein the predetermined loss function representation is multivariate Taylor expansion
  wherein the multivariate Taylor expansion is $$\mathcal{L}(\vec{x}, \vec{y}) = -\frac{1}{n}\sum_{i=1}^{n}\left[\theta_2(y_i - \theta_1) + \frac{1}{2}\theta_3(y_i - \theta_1)^2 + \frac{1}{6}\theta_4(y_i - \theta_1)^3 + \right.$$
$$\left. \theta_5(x_i - \theta_0)(y_i - \theta_1) + \frac{1}{2}\theta_6(x_i - \theta_0)(y_i - \theta_1)^2 + \frac{1}{2}\theta_7(x_i - \theta_0)^2(y_i - \theta_1)\right];$$

(iii) evaluating each of the candidate loss functions in the first set of candidate loss function with the CNN model including:
  (a) building each of the first candidate loss functions using the initial set of candidate loss function parameters;
  (b) at least partially training the CNN model on a training data set related to the classification problem using each of the first candidate loss functions;
  (c) evaluating the CNN model trained with each of the first candidate loss functions on a validation data set related to the classification problem;
  (d) obtaining individual fitness values for each of the first candidate loss functions from the evaluation in (c);
 (iv) ranking each of the first candidate loss functions in accordance with individual fitness values, wherein each of the first candidate loss functions includes a different set of candidate loss function parameters;
 (v) repeating steps (ii) to (iv) for multiple generations to optimize the loss function for the CNN model solving the classification problem, including replacing the initial mean vector solution with a new mean vector solution derived from a ranked first candidate loss function in accordance with fitness value; and
 (iv) selecting an optimized loss function for training the CNN model solving the classification problem at a predetermined selection point,
  wherein the selected optimized loss function trains the CNN model to solve the classification problem in fewer steps and with higher accuracy than a process for training the CNN model using cross-entropy loss or BaikalCMA loss function.

5. The non-transitory computer-readable medium according to claim 4, wherein the optimization process is a covariance-matrix adaptation evolutionary strategy (CMA-ES).

6. The non-transitory computer-readable medium according to claim 5, wherein the CMA-ES is a variant (µ/µ,;\.)-CMA-ES, which incorporates weighted rank-µ updates.

7. A process for optimizing a loss function to train a convolutional neural network (CNN) model solving a classification problem comprising:

in a first subprocess, iteratively sampling a set of candidate loss function parameter vectors by a multi-dimensional continuous value optimization process running on one or more processors, wherein the candidate loss function parameter vectors are used to build candidate loss functions in accordance with predetermined loss function representation;

in a second subprocess, evaluating by an evaluation process running on or more processors, each candidate loss function built with a sampled candidate loss function parameter vector in the set in the model for solving the classification problem and determining a fitness value for each candidate loss function;

in a third subprocess, ranking by the continuous value optimization process each candidate loss function in accordance with its fitness value and initiating a next iteration of the first subprocess of sampling based on the ranking; and repeating the second subprocess, the third subprocess and the first subprocess for multiple generations until an optimized loss function for the CNN model solving the classification problem is selected at a predetermined selection point, wherein the predetermined loss function representation is multivariate Taylor expansion;

wherein the multivariate Taylor expansion is:

$$\mathcal{L}(\vec{x}, \vec{y}) = -\frac{1}{n}\sum_{i=1}^{n}\left[\theta_2(y_i - \theta_1) + \frac{1}{2}\theta_3(y_i - \theta_1)^2 + \frac{1}{6}\theta_4(y_i - \theta_1)^3 + \theta_5(x_i - \theta_0)(y_i - \theta_1) + \frac{1}{2}\theta_6(x_i - \theta_0)(y_i - \theta_1)^2 + \frac{1}{2}\theta_7(x_i - \theta_0)^2(y_i - \theta_1)\right]$$

and further wherein the selected optimized loss function trains the CNN model to solve the classification problem in fewer steps and with higher accuracy than a process for training the CNN model using cross-entropy loss or BaikalCMA loss function.

8. The process according to claim 7, wherein the optimization process is a covariance-matrix adaptation evolutionary strategy (CMA-ES).

9. The process according to claim 8, wherein the CMA-ES is a variant (μ/μ,;\.)-CMA-ES, which incorporates weighted rank-μ updates.

* * * * *